United States Patent [19]
Hirata

[11] 3,751,146
[45] Aug. 7, 1973

[54] CONTROL DEVICE FOR OVERLAP PHOTOGRAPHY IN MOTOR DRIVEN MOTION PICTURE CAMERA

[75] Inventor: Hiroshi Hirata, Osaka-fu, Japan
[73] Assignee: Minolta Camera Kabushiki Kaisha, Osaka, Japan
[22] Filed: Mar. 17, 1971
[21] Appl. No.: 125,058

[30] Foreign Application Priority Data
Mar. 17, 1970 Japan.............................. 45/24991
Mar. 17, 1970 Japan.............................. 45/24992

[52] U.S. Cl. ................................................ 352/91
[51] Int. Cl. .......................................... G03b 21/36
[58] Field of Search ........................................ 352/91

[56] References Cited
UNITED STATES PATENTS

| | | | |
|---|---|---|---|
| 3,545,852 | 12/1970 | Winkler | 352/91 |
| 3,567,316 | 3/1971 | Wilharm | 352/91 |
| 3,597,061 | 8/1971 | Stieringer | 352/91 |
| 3,606,529 | 9/1971 | Reinsch | 352/91 |
| 3,637,301 | 1/1972 | Nakayama | 352/91 |
| 3,661,448 | 5/1972 | Thiele | 352/91 |
| 2,517,250 | 8/1950 | Shea et al. | 352/91 X |
| 3,246,944 | 4/1966 | Winkler | 352/91 |
| 3,419,325 | 12/1968 | Mayr | 352/91 |

Primary Examiner—John M. Horan
Attorney—Watson, Cole, Grindle & Watson

[57] ABSTRACT

A control device to effect overlap photography in a motor driven motion picture camera sequentially operable to effect a fade-out photography, a film rewinding, and a fade-in photography.

By manually changing-over the camera to a fade-out photography, the fully opened shutter means is closed by the control device for taking a fade-out picture and is locked at the fully closed aperture. After locking of the shutter means is terminated, rewinding of the film in which the fade-out picture is taken is automatically actuated by the control device for preventing exposure of the rewinding film during film rewinding, and the power source is opened upon termination of film rewinding. Locking of the shutter means is released by the control device through a changing-over of the camera to a normal photographing for taking a fade-out photography through a release operation of the camera.

4 Claims, 3 Drawing Figures

3,751,146

PATENTED AUG 7 1973

INVENTOR.
BY *Hiroshi Hirata*
*Watson, Cole, Grindle & Watson*

CONTROL DEVICE FOR OVERLAP PHOTOGRAPHY IN MOTOR DRIVEN MOTION PICTURE CAMERA

BACKGROUND OF THE INVENTION

The present invention relates to a control device to effect overlap photography in a motor driven motion picture camera, and more particularly to such a control device having a simple construction, wherein the film rewinding of the camera is started after the shutter opening is fully closed. A locking device is provided device for preventing the shutter opening from being released accidently during film rewinding, and a switch mechanism is provided for automatically releasing a driving motor circuit and a circuit attached to the camera even though a release switch interlocked with the shutter release operation is being closed at the time the film rewinding is completed.

In related applications filed by the present applicant in Japan on an overlap photographing device, Ser. No. 57537/70 (filed July 23, 1970) and Ser. No. 66411/1970 (filed Aug. 24, 1970), a motor driven motion picture camera is disclosed to automatically effect fade-out photographing in an overlap photographing device without having the film length during winding. When the change over member for ordinary photographing and for overlap photographing is changed over to overlap photographing, the time set up member and the shutter opening change member operated by the driving motor and the interlocking clutch, are operated. At the time the shutter openig is fully closed by the shutter opening change member, the time set up member reverses the polarity of motor driving circuit, and only the shutter opening change member remains at the full closing position. While the time set up member is in being returned the film is rewinded, and when the film rewinding is completed, the time set up member releases the change over member for changing over to the overlap photograph side and the motor circuit is released.

In these disclosures, there is an advantage of that the proper overlap photograph can be effected at any time. However, the time set up member and the shutter opening change member are coupled with each other through gears in the fade-out photographing, since they are separate members, so that these prior inventions are lacking in maintaining a complete locking to insure that the time set up member does not operate the reversing circuit for the driving motor before the shutter opening change member fully closes the shutter. Also, the shutter opening is held in a fully closed condition while the film is being rewinded. Furthermore, these prior developments do not have adequate interlock arrangements for reliably opening the attachment circuit of the camera, for example, the automatic exposure control circuit at the time the film rewinding is completed.

OBJECTS OF THE INVENTION

One object of the present invention is to provide a control device for overlap photography in a motor driven motion picture camera which avoids the drawbacks mentioned above in the prior inventions and which is restrained when the shutter opening change member operated by the time set up member is fully closed.

Another object of the present invention is to provide such a control device which reversely turns the driving motor in interlocking engagement with the restraining operation from the fade-out photographing to the film rewinding.

A further object of the present invention is to provide such a device in a cinecamera, in which after the film rewinding is completed, by changing over from the overlap photographing to ordinary photographing the, restraint against the full closing condition of the shutter opening effected by said shutter opening change member is released and the motor is restored to the normal rotation side.

A still further object of the present invention is to provide such a control device in which there is provided a maintenance switch closed in interlocking engagement with the starting of the time set upmember, a normal/reverse rotation change over switch for the motor circuit, and a starting switch. In the normal/reverse rotation change over switch for the motor circuit and the attachment circuit in parallel therewith, the starting switch and the maintenance switch in parallel with each other are inserted in series, and when the film rewinding during overlap photographing is completed, the starting switch and the maintenance switch are opened at the same time so as to automatically release the motor circuit and the attachment circuit.

SUMMARY OF THE INVENTION

In order to attain the objects mentioned above the present invention relates to a control device for overlap photography in a motor driven motion picture camera, in weich there is provided a changeover member for changing over the ordinary photographing and the overlap photography in a camera, a reversible driving motor, a time set up member, a maintenance switch for engaging with said time set up member, a shutter opening change member, a transmitting member connected to said driving motor to be driven thereby and alternatively engageable with either of said time set up member or said shutter opening change member by means of said changeover member for driving said appropriate member, a locking member on an operation member for restraining the shutter opening change member when said shutter opening change member fully closes said shutter opening and engaging with said changeover member, a changeover switch alternatively settable between a first position to drive the motor in a normal direction and a second position to drive the motor in a reverse direction operated by said operation rod, and a starting switch; and during ordinary photographing said operation rod for engaging with the changeover member puts said changeover switch in the normal rotation side to close said starting switch and hold said time set up member and said shutter opening change member in the stopping condition regardless of the motor for normally rotating. During overlap photography, said time set up member engages with said operation rod to restrain it and put said changeover switch in the normal rotation side and closes said starting switch, and by means of the motor for normally rotating said change over member drives the time set up member and at the same time the shutter opening change member through said time set up member so as to effect the fade-out photographing. When the shutter opening is fully closed said locking member on the operation member restrains said shutter opening change member at the position in its full closing state and puts the changeover switch in the reverse rotation side and in addition opens said starting switch; and the motor reversed by the maintenance switch in the closing state due to the time set up member and the change over member effect the film rewinding while restoring said time set up member. When the film rewinding for the given length is finished the time set up member opens the maintenance switch to automatically stop the motor driving, and when changed over again to the ordinary photographing the change over member engages with the operation member to release its restraining against the shutter opening change member from the locking member and puts the changeover switch in the normal rotation side and in addition closes the starting switch; and the motor for normally rotating and the change over member effects the fade-in photographing while restoring the shutter opening change member, and when the shutter opening is fully opened the ordinary photographing is effect in succession.

DESCRIPTION OF THE PREFERRED EMBODIMENT

Figure 1:
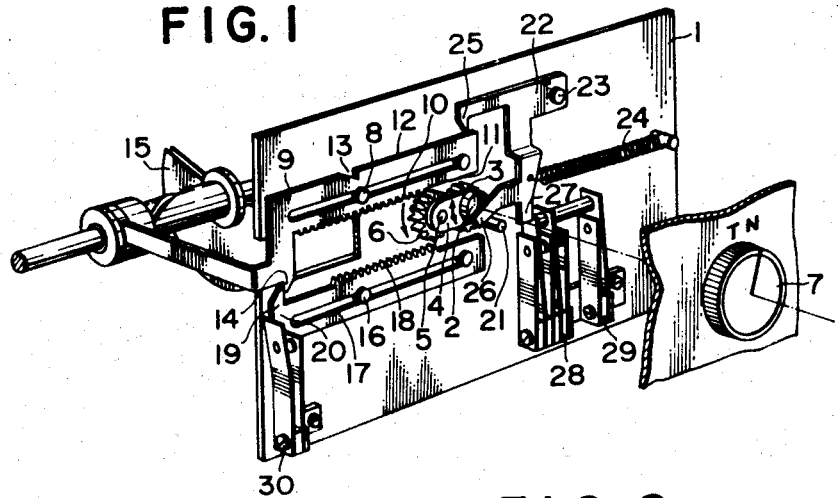
FIG. 1 is a perspective view of the essential portion of an embodiment in accordance with the present invention.

With reference to FIG. 1, the essential portion of the mechanical formation in accordance with the present invention will be described hereinafter. A camera gear 3, having a spindle 2 thereon supported on base plate 1 is rotatable in interlocking engagement with motor 32 shown in FIG. 2. Gear 6, rotatably supported on spindle 5 of arm 4 which extends from said spindle 2, is meshed with said gear 3 and, when motor 32 rotates normally, gear 6 is rotated in the direction shown by the arrow. Said spindle 2 and arm 4 are changed over as a change over member to the ordinary photographing, shown by N, and the overlap photography shown by T, by means of change over knob 7 extending to the outside of the camera case body. An eccentric pin 21 is mounted on spindle 2.

Shutter opening change member 9, guided by pins 8 mounted on base plate 1, and a time set up member 17, guided by pins 16 mounted on base plate 1 in the same way, are slidably supported in parallel with each other relative to base plate 1. Rocks 10, 18 are respectively provided on each member 9, 17 and, when said knob 7 is turned to the ordinary photographing N side, said 7 gear 6 is able to mesh with rack 10 on shutter opening change member 9. In FIG. 1, in the position where said shutter opening change member 9 is pushed to move to the left, said meshing is disconnected by toothless portion 11 formed on the right end of rack 10. And, when change over knob 7 is turned counter-clockwise to the trick photographing T side, said gear 6 is able to mesh with rack 18 on time set up member 17; and on rack 18 there is formed a toothless portion for disconnecting said meshing when said rack 18 is pushed to move to the right in FIG. 1.

Said time set up member 17 is provided on its left end with protrusion 19 extending upwardly, and said protrusion 19 is able to engage with protrusion 14 located to the left end of the opening of member 9. When time set up member 17 is pushed to move to the right said both protrusions 19, 14 engage with each other so that shutter opening change member 9 also is pushed to move to the right together therewith.

Shutter opening change member 9 is coupled with a well known shutter opening change mechanism 15 which, when moved to the right, said shutter opening change member 9 closes said shutter opening change mechanism 15 and closes it fully in the extreme right end position; and, when moved to the left, the shutter opening change member 19 opens said shutter opening change mechanism 15 and fully opens it in the extreme left end position. On the upper edge thereof a restraining notch 13 is provided.

An operation rod 22 in the inverted F-letter shape is on spindle 23 and is biased for counter-clockwise rotation by means of a spring 24. Its lower arm 26 is able to engage with eccentric pin 21 of said spindle 2, and a restraining pawl 25 formed on its upper arm slides in contact on the upper edge 12 of shutter opening change member 9. Its vertical arm 27 is in contact with a switch mechanism later to be hereinafter described.

As for said switch mechanism, when operation rod 22 rotated clockwise against spring 24, changeover switch 28 is changed over to the normal rotation side and starting switch 29, opened ordinarily against the closing tendency, is closed. By the counter-clockwise, rotation of operation rod 22, said changeover switch 29 is changed over to the reverse rotation side and starting switch 29 is opened. In addition to these switch mechanisms, a maintenance switch 30 is provided on base plate 1 and has a closing tendency. Switch 30 is operated in interlocking when contacted by left edge 20 of time set up member 17. When time set up member 17 is located in the left end position, said maintenance switch 30 is opened; and in accordance with the start of time set up member 17 to the right, said maintenance switch 30 is closed.

Figure 2:
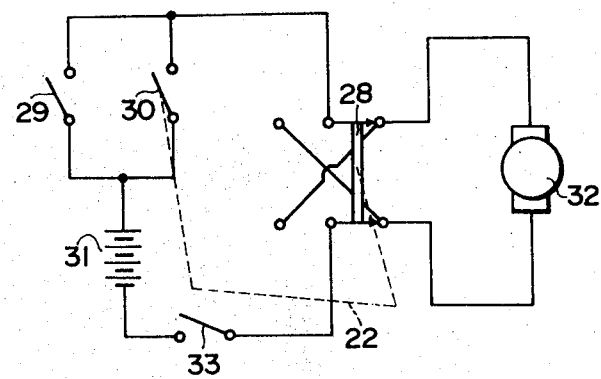
FIG. 2 is a motor circuit diagram in said embodiment.

With reference to FIG. 2, the motor circuit provided with said switches will be described hereinafter. To electric power source 31, there is formed a series circuit comprising a starting switch 29 and maintenance switch 30 in parallel with one another, changeover switch 28 for converting the power source polarity, motor 32, and a release switch 33 closed in interlocking when the release button is depressed.

Since the present invention is formed as described above, in the condition shown in FIG. 1, when change over knob 7 is turned clockwise so as to be located on the normal photographing N side, eccentric pin 21 of spindle 2 comes into contact with lower arm 26 of operation rod 22 which restraining pawl 25 has been already in contact with upper edge of shutter opening change member 9 in the full opening state and has been located in the clockwise turning position against spring 24. Accordingly, its vertical arm 27 places changeover switch 28 in the normal rotation side and starting switch 29 is located in the closing state. And, by the clockwise turning of spindle 2, gear 6 has been turned to the upside; but by facing to the toothless portion 11 of shutter opening change member 9, both are out of meshing engagement.

Therefore, upon pushing the release button to close switch 33, the electric current from electric power source 31 closes the motor circuit through starting switch 29, changeover switch 28 on the normal rotation side, motor 32, and release switch 33, to normally rotate motor 32 so as to effect photographing. However, gear 6 runs idle, and shutter opening change member 9 and time set up member 17 hold respectively the position shown in FIG. 1. Accordingly, the ordinary photographing is effected in succession.

Next, when taking the overlap photograph, upon turning change over knob 7 counter-clockwise from the position shown in FIG. 1 to the overlap photograph T side, arm 4 of gear 6 also is turned counter-clockwise relative to spindle 2 and gear 6 engages with rack 18 of time set up member 17. In this case, the restraining pawl 25 of operation rod 22 is on the upper edge 12 of shutter opening change member 9, so that said operation rod 22 holds its clockwise turning position and changeover switch 28 is closed to the normal rotation side and, also, starting switch 29 is in the closing position. Accordingly, when release switch 33 is closed, the normal rotation circuit of motor 32 is closed and gear 6 is turned to the direction shown by the arrow to effect photographing. As the photographing, progresses time set up member 17 is moved to the right by means of gear 6 turned in the direction shown by the arrow. Shutter opening change member 9 also is moved to the right since protrusion 14 is engaged with protrusion 19. The shutter opening is gradually decreased, by shutter opening change mechanism 15, to effect fade-out photographing. And, when the shutter opening is fully closed, restraining pawl 25 of operation rod 22, which is given the counter-clockwise turning tendency by spring 24, fits in restraining notch 13 formed on the upper edge 12 of shutter opening member 9 to engage with each other and said restraining pawl 25 restrains shutter opening change member 9. At the same time, vertical arm 27 of operation rod 22 for counter-clockwise turning changes over changeover switch 28 to the reverse rotation side to open stargting switch 29. However, simultaneously with said movement of time set up member 17 to the right, maintenance switch 30 is turned to the closing state so that the motor circuit closes the reverse rotation circuit and gear 6 is turned to the direction opposite the arrow to restore time set up member 17 to the left with the progress of the film rewinding. On the other hand, shutter opening change member 9 is restrained in its right end position by restraining pawl 25 as described above and the shutter holds its full closing position. Accordingly, there is no possibility of the film being exposed during rewinding.

When time set up member 17 is restored to the starting position shown in FIG. 1 and the film rewinding is completed, its front edge 20 opens maintenance switch 30. And, as the result, starting switch 29 and maintenance switch 30 in parallel with each other in the motor circuit are opened, so that the motor circuit is opened even though release switch 33 is closed; and motor 32 is automatically stopped and the fade-out photographing and its same length film rewinding are automatically effected.

Next, upon changing the photographic scene and a clockwise turning of change over knob 7 to the ordinary photograph N side, eccentric pin 21 of spindle 2 is turned counter-clockwise to push clockwise to move lower arm 26 of operation rod 22 engaged with said eccentric pin 21 and retreat pawl 25 from restraining notch 13 to disconnect the engage relation of both; also to turn its vertical arm 27 clockwise to change over switch 28 to the normal rotation side and close staring switch 29. Therefore, upon closing release switch 33, motor 32 is normally rotated to take up the film and gear 6 meshes with rack 10 of shutter opening change member 9 to restore it to the left; and, by shutter opening change mechanism 15, the shutter is gradually opened and the fade-in photographing is overlapped on the film on which said fade-out photograph is taken: When the shutter is fully opened shutter opening change member 9 is stopped in the starting position shown in FIG. 1 by toothless portion 11 of rack 10 and thereafter the ordinary photographing is effected in succession.

Figure 3:
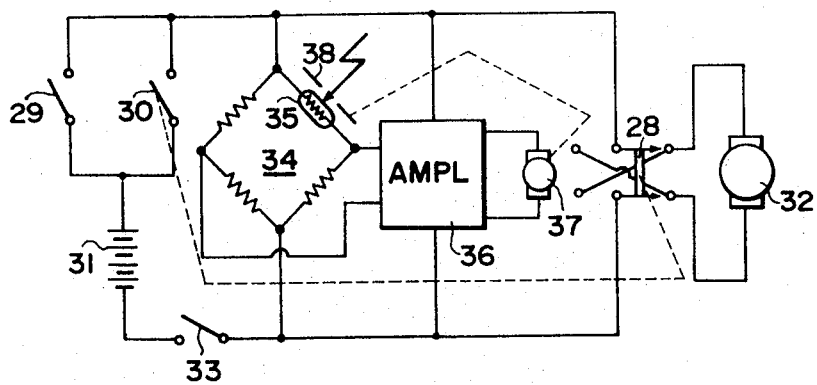
FIG. 3 is a circuit diagram of an embodiment provided with the same arrangement as in FIG. 1 and an automatic exposure control circuit as an attachment circuit.

The embodiment in FIG. 3 shows the circuit diagram, wherein in parallel with changeover switch 28 and motor 32, FIG. 3 shows a circuit diagram in which there are provided as an attachment circuit for the camera automatic exposure control device, circuits 36, 37 and detecting circuit 34 thereof. When the film rewinding is completed, and motor 32 is automatically stopped, said circuits also are automatically opened simultaneously therewith so as to prevent the expenditure of electric power souurce 31. To electric power source 31, said starting switch 29 and maintenance switch 30 in parallel with each other, and release switch 33, motor 32 is inserted through changeover switch 28 in series thereto. Also, in parallel therewith, there are connected detecting circuit 34 composed of the bridge circuit having on its one arm photoreceiving element 35, amplifier 36 for amplifying the output from said detecting circuit 34, and photometer motor 37 operated by the output thereof in parallel with each other. And, said photometer motor 37 constitutes an automatic balance meter for controlling diaphragm 38 on the front of photoreceiving element 35. Said sutomatic exposure control device circuits are prepared to consume electric current of 50 ma for controlling when connected to electric power source 31.

Merely by arranging such automatic exposure control device circuits to be opened/closed only by a release switch, when fade-out photographing and film rewinding thereof are carried out during overlap photography, the motor circuit is automatically opened regardless of closing of the release switch and the camera is stopped, but the automatic exposure control device circuit holds still the operation state and the electric current is expended. Thereupon, in the present invention, by providing the automatic exposure control device circuits in parallel with the motor and its changeover switch as described above, fade-out photographing and film rewinding thereof during overlap photography are completed. Regardless of the release switch, the camera is stopped and simultaneously the automatic exposure circuit also is opened to stop the electric current so as to prevent the expenditure of electric power current.

Said attachment circuit is not limited to the automatic exposure control device circuit, and it can be applied also to, for example, a simultaneous sound recording circuit and the like.

The present invention shown in said embodiment is not limited only to said embodiment, and various modifications thereof can be provided without deviating from the spirit of the present invention.

What is claimed is:

1. In a motor driven motion picture camera, a control device for over-lap photography, comprising:
   a reversible driving motor;
   a change-over switch alternatively settable between a first position to drive said motor in a normal direction and a second position to drive said motor in a reverse direction;
   shutter means having a variable aperture;
   an electric power source;
   a first and a second contact switch connected in parallel with each other between said electric power source and said driving motor;
   a first control member interlocked with said shutter means to control the aperture thereof as a function of the position of the first control member, the first control member being movable between a first position for fully opening the aperture and a second position for blocking the aperture, and having a stopper portion;
   a second control member movable from a first position to a second position which is capable of moving said first control member from said firt position to said second position with the movement thereof, and movable reversely by itself, said first contact switch being normally closed and opened with said second control member being at said first position thereof;
   a transmitting member mechanically connected to said driving motor to be driven thereby and alternatively engageable with either of said control members for transmitting said motor driving to said appropriate member;
   an operating member having a latch means engageable with said stopper portion when said first control member is brought to said second position thereof, and a switch actuating means for setting said changeover switch to said second position and opening said second contact switch with said latch means engaging with said stopper portion;
   a manual operation member connected to said transmitting member and manually settable to a normal position fosetting the transmitting member to a position to engage with said first control member and to an overlap position for setting the transmitting member to a position to engage with said second control member, said manual operation member being engageable with said operating member for disengaging the latter from the stopper portion while said manual operation member is at said normal position, and said first control member having a portion to disengage said driving member when said first control member is at said first position and said manual operation member is at said normal position.

2. A control device as set forth in claim 1, wherein said first and second control members are slidably mounted on a camera body and have a rack portion respectively, and said transmitting member has a pinion alternatively engageable with either of said rack portions.

3. A control device as set forth in claim 2, wherein said first control member has an edge on which a recess is formed as said stopper portion, and said operating member is biased to be in contact with said edge of the first control member.

4. A control device as set forth in claim 1, further comprising an exposure control circuit connected in parallel with said driving motor.

* * * * *